Patented May 28, 1940

2,202,233

UNITED STATES PATENT OFFICE 2,202,233

STABILITY OF LUMINOUS PAINTS

Konrad Schad, Frankfort-on-the-Main-Hochst, Germany, assignor to I. G. Farbenindustrie Aktiengesellschaft, Frankfort - on - the - Main, Germany No Drawing. Application July 6, 1938, Serial No. 217,822. In Germany July 22, 1937

2 Claims. (Cl. 250—81)

The present invention relates to an improvement of the stability of luminescent alkaline earth metal sulfides and of luminous paints containing such sulfides.

Alkaline earth metal sulfides are known, very sensitive substances. Even when stored under atmospheric conditions the pulverulent luminous pigment is attacked, the sulfide assuming a yellow to brown coloration with evolution of hydrogen sulphide and loss of its luminescent power. Not only the moisture and carbon dioxide contained in the atmosphere, but also light, especially of short wave length, has an effect on the pigment. Especially sensitive are the luminous substances containing strontium as the main constituent which are the most important for practical purposes on account of their relatively strong luminescent power. The said pulverulent luminous pigments containing alkaline earth metal sulfides, therefore, must be stored in airtight containers protected against ultraviolet rays.

In most of the cases luminous substances are industrially applied in the form of paint. In spite of all efforts it has hitherto, however, not been possible to find suitable binding agents for the sensitive alkaline earth metal sulfides which protect the luminous pigment for a prolonged time against the common action of the moisture and the carbon dioxide content of the atmosphere and against the light rays of short wave length.

Now I have found that—and this being surprising—by the addition of finely pulverised, pure boric anhydride (boron trioxide) to pulverulent, luminous pigments containing alkaline earth metal sulfides as the main constituents prepared in the usual manner, or to paints containing such pigments the destruction of the luminescent power by the action of light and air may be prevented to a great extent. In this case an addition of about 10 per cent. of boric anhydride is sufficient so that the strength of the luminescence is not perceptibly decreased by the addition of the non-luminscent boric anhydride.

If, for instance, a pulverulent strontium sulfide luminous pigment, activated by a small quantity of bismuth, which is especially sensitive, is moistened with water, an evolution of hydrogen sulfide sets in after a few minutes with spontaneous heating; the pigment becomes brown and the luminescent power is completely lost within a very short time. If, however, the same strontium sulfide luminous pigment is mixed with 10 per cent. of anhydrous, finely pulverised boric anhydride, no brown coloration occurs on moistening with water and even after an action of 24 hours the luminescent power is almost completely maintained.

At the time being it is not yet possible to explain the specific action of the addition of boric anhydride. This action is especially surprising as the luminous substances containing sulfides are especially readily decomposed by the action of acids or of substances of acid character.

It has already been proposed to use borax or boric acid compounds as sintering agents (the so-called "melting addition") in the preparation of luminous pigment from earth metal sulfides by a thermal action of sulfur upon alkaline earth metal oxides.

In contradistinction thereto the process of this invention relates to improving the stability of the luminous pigments from alkaline earth metal sulfides, by adding boric anhydride to the already finished, i. e., fired, luminous pigment.

The following example serves to illustrate the invention, but is not intended to limit it thereto:

100 grams of a luminous strontium sulfide are well mixed with 10 grams of finely pulverised boric anhydride and the mixture is applied upon a suitable carrier, polystyrene lacquer being used as binding agent. When this painting is placed in the open air so that it is exposed to the action of the atmosphere and light, the beginning of the discoloration of the painting is retarded for months in contradistinction to a comparison painting which is prepared in the same manner but without the addition of boric anhydride to the powder of the luminous paint.

Instead of polystyrene lacquer there may, of course, be used other binding agents that are stable in the luminous paint in presence of the boric anhydride and which yield a sufficiently impenetrable film resistant to moisture when incorporated in the luminous paint.

I claim:

1. A process of improving the stability of luminous pigments containing sulfides of alkaline earth metals and of paints and paintings containing such pigments which comprises adding pulverized boric anhydride to the pulverulent luminous pigment after firing.

2. A process of improving the stability of luminous pigments containing sulfides of alkaline earth metals and of paints and paintings containing such pigments which comprises adding 10 per cent of pulverized boric anhydride to the pulverulent luminous pigment after firing.

KONRAD SCHAD.